United States Patent
Meyres

[15] 3,693,670
[45] Sept. 26, 1972

[54] PLASTIC LAMINATED SHUTTLES HAVING PLASTIC CORES OF IMPROVED IMPACT RESISTANCE

[72] Inventor: Kenneth Donald Meyres, Cincinnati, Ohio

[73] Assignee: North American Rockwell Corporation, Pittsburgh, Pa.

[22] Filed: Feb. 9, 1971

[21] Appl. No.: 113,921

[52] U.S. Cl. ................................................. 139/196
[51] Int. Cl. ................................................. D03j 5/02
[58] Field of Search ........................... 139/196–198

[56] References Cited

UNITED STATES PATENTS

| 3,565,124 | 2/1971 | Dupre | 139/196 |
| 2,781,791 | 2/1957 | Neely | 139/196 |
| 2,824,581 | 2/1958 | Heard | 139/196 |
| 2,905,208 | 9/1959 | Goreau | 139/196 |
| 3,089,522 | 5/1963 | Phelps | 139/196 |
| 3,209,790 | 10/1965 | Naul | 139/196 |
| 2,445,899 | 7/1948 | Williams | 139/196 |

FOREIGN PATENTS OR APPLICATIONS 567,192  10/1958  Belgium

Primary Examiner—James Kee Chi
Attorney—John R. Bronaugh, Floyd S. Levison, E. Dennis O'Connor and Richard A. Speer

[57] ABSTRACT

Plastic laminated shuttles are provided with cores which form the ends of the shuttle consisting of high impact, cross-linked polyolefin, which reduces the weight of the shuttle and hence its inertia and increases the resilient characteristics of the core, which reduces or eliminates splitting of the core and also permits reduction in operational noise when used in flying shuttle looms.

4 Claims, 4 Drawing Figures

PATENTED SEP 26 1972
3,693,670
SHEET 1 OF 2
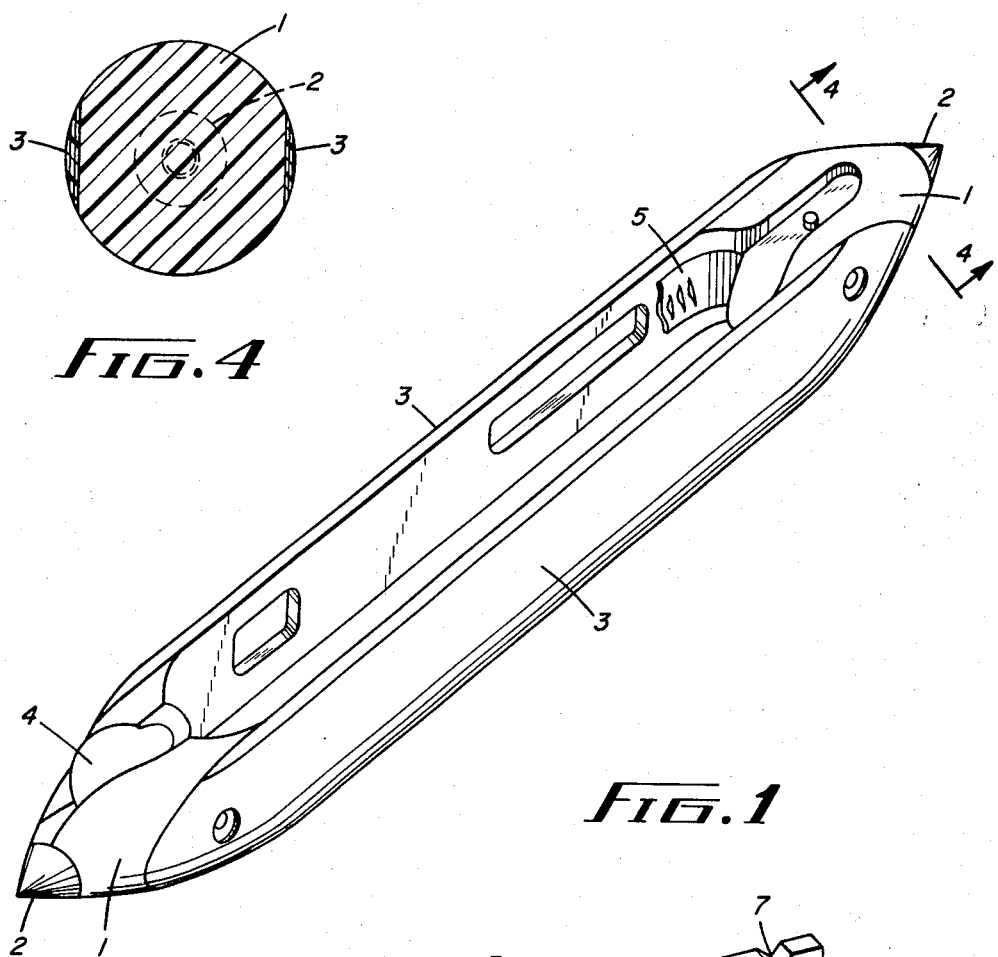
FIG.4
FIG.1
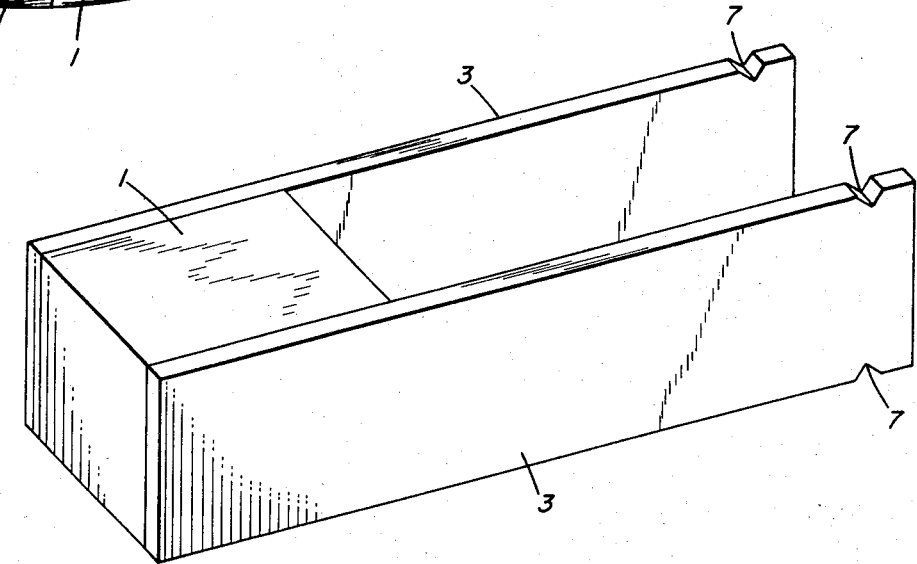
FIG.3
INVENTOR.
KENNETH DONALD MEYERS
BY
James T. Dunn
ATTORNEY

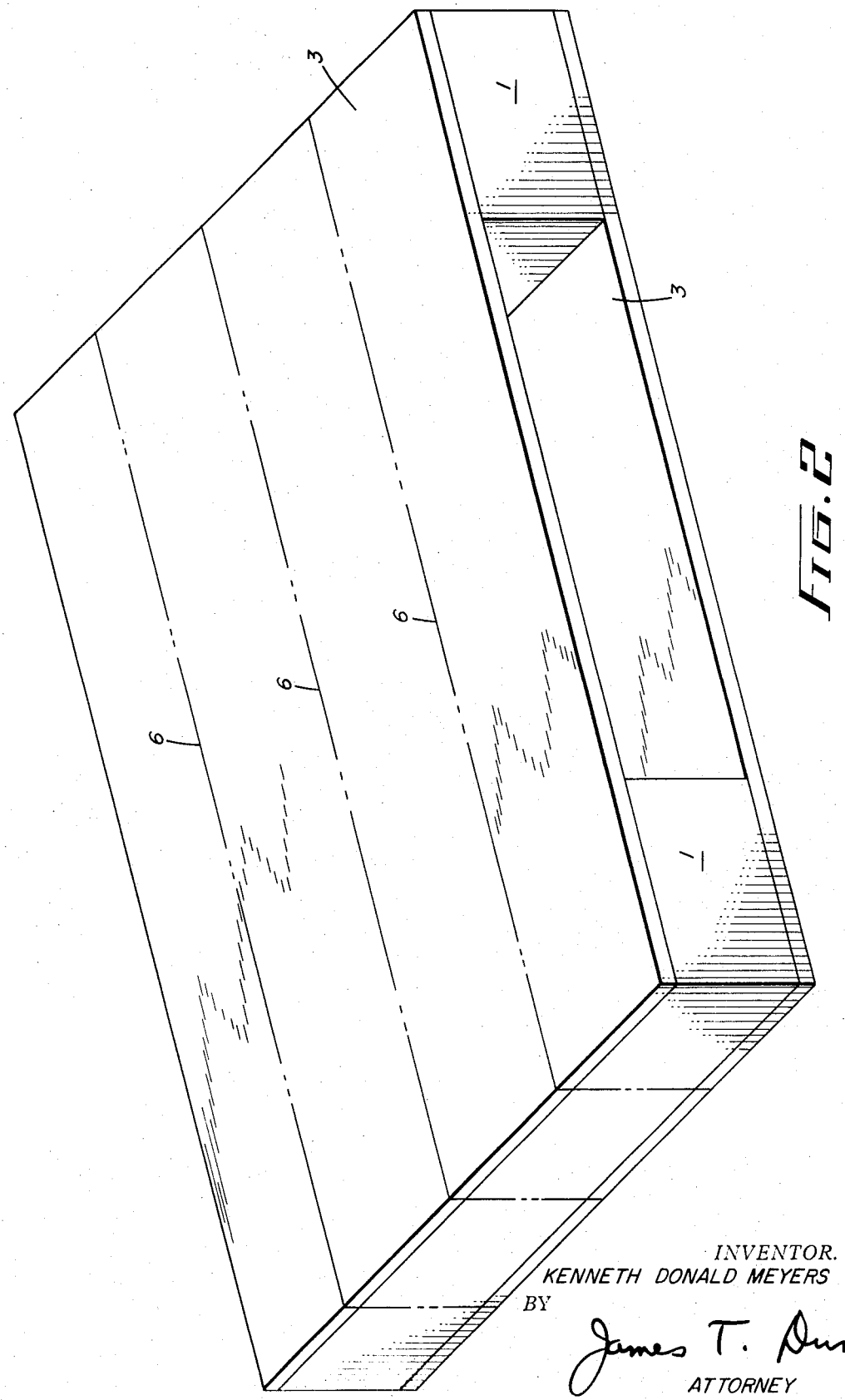

PLASTIC LAMINATED SHUTTLES HAVING PLASTIC CORES OF IMPROVED IMPACT RESISTANCE

BACKGROUND OF THE INVENTION

Originally loom shuttles were made of wood. This was the standard material for more than a century. More recently, shuttles of resin impregnated laminates have been proposed using thermosetting resins such as thermosetting phenolic resins, reinforced with fabrics. This construction constituted a substantial improvement over wood, exhibiting longer life, more abrasion resistance, and smooth wearing surfaces.

Laminated shuttles in general are made with side walls which consist of laminated resin impregnated fabric and cores which, at the ends of the shuttle, carry the metal reinforcing tips which are used to absorb the blows of the picker stick. In the past these cores have either been made of laminated resin impregnated fabric or of random fiber reinforced resin using macerated fabrics. The cores are fastened to the laminated side walls and show improved wear and abrasion resistance as compared to wooden shuttles. The rigid thermoset cores have created some problems as they sometimes split or the shuttle tip loosens, with accompanying bond failure of the tip adhesive. Also, the specific gravity of the core material is quite high and, as a result, the overall weight of the shuttle is sufficient that shuttle inertia sets a very definite limit on the speed of weaving, 190 to 200 picks per minute representing about as high speed as is usually practical.

The prior art, as is known to the present inventor relating to textile shuttles is shown in the following U.S. Patents—Nos. 3,089,522, 3,215,762, 3,263,708.

The future prior art will be represented by the U.S. application Ser. No. 105,389 filed Jan. 11, 1971, now U.S. Pat. No. 3,660,219. (Attorney's docket No. 23,332) which specification, claims, and drawings are incorporated herein by reference.

SUMMARY OF THE INVENTION

The present invention replaces the relatively rigid core material employing thermosetting resins as laminating agents with a high impact, cross-linked polyolefin such as high impact, cross-linked polyethylene, which shows improved resilience. The high impact, cross-linked polyethylene can be bonded to the side walls and then hardware affixed. Splitting is substantially eliminated, as is loosening of hardware, such as tips and the resilience absorbs a considerable amount of the shock in looms of the flying shuttle type. It is thus possible to operate the loom at substantially higher rates, for example 235 picks per minute or more, which decreases the cost per unit of fabric woven.

Because of the low specific gravity of the high impact, cross-lined polyethylene, the weight of the typical shuttle can be reduced about 10 percent, which is about 2 ounces per loom ready shuttle. As has been pointed out above, this permits more rapid loom operation and extended shuttle life, and because of the resilience of the cross-linked polyethylene cores, loom noise is substantially decreased which is becoming of increasing importance in industrial environmental noise control.

The particular thermoplastic material used is quite unusual as most thermoplastic materials are not satisfactory. The cross-linked polyethylenes of the present invention are substantially heat insensitive or thermally immobile and are unaffected by operating temperatures up to 105° C and show excellent embedments of the tip and greatly reduce core splitting. A further advantage is that the metal shuttle tips when heated to about 200°C can be inserted into a hole drilled in the core. Since the core is able to plastically deform and then reform around the tip shank thus obviating the need for adhesives or other mechanical fastening systems.

The polyethylenes may be either pigmented or unpigmented, and the cross-linking may be effected by any of the known cross-linking techniques, such as peroxides, radiation, and the like. The fact that no special techniques of cross-linking are needed is an advantage of the present invention as it does not require specially made, and therefore more expensive, core materials. It will be shown that all ordinary thermoplastics produce unsatisfactory results, but it is not intended to limit the present invention to any theory of why this is the case. Comparison with other materials will be set forth in the specific description later on.

My first choice of materials were those having low density, toughness and wear resistant characteristics. It was apparent that the class of polyolefin would be light in weight and that ultra high molecular weight polyethylenes such as Hercules Incorporated, Hi-Fax 1900, would be suitable abrasion resistant. It is well known that because of the toughness and abrasive resistant nature of this latter material, it has found extensive use in applications such as snow ski runners; paper making machine suction box covers; textile mill; loom accessories; the facing plate on snow plows; and others.

An abrasive test based on a sand-water slurry and described in a Hercules Hi-Fax 1900 brochure lists a number of materials evaluated. Tests were conducted by rotating a specimen for 7 hours at 1,750 rpm in a sand-slurry. Carbon steel was assigned an abrasion rating of 100 and results of the other materials tested are expressed in relation to this figure, viz. the lower the figure the better the wear properties:

| | | |
|---|---|---|
| Ultra high molecular weight (3–5MM) | polyethylene | 15 |
| Acetal | | 230 |
| Cast Nylon | | 57 |
| Fluorocarbon-filled acetal | | 335 |
| Hard maple | | 685 |
| Nylon 6/6 | | 78 |
| Polyphenylene Oxide | | 74 |
| Polypropylene | | 189 |
| Polysulfone | | 300 |
| Polyurethane | | 84 |

We have made similar tests in our laboratory and substantiate the above properties.

Cores were made from the Hi-Fax 1900 material and fabricated into shuttles. I found that such a material is not suitable because after about 500,000 picks on the loom, wherein operating temperatures of about 105° C are often observed on the shuttle body, the core softens, allowing the tip to imbed further into the core leaving a rough interface between the metal tip and core permitting fibers to hang up.

After Hi-Fax 1900 core material failed, I then selected a cross-linkable polyethylene available from U.S. Industrial Chemical Company and identified as XC142 and not containing mold releasing agents such as stearic acid and the like. Knowing the density would be as low as that of the high molecular weight polyethylene and expecting the heat resistance to be better because of the cross-linking, surprisingly, I found that the use of a relatively low molecular weight polyethylene and cross-linked by means of peroxide achieved toughness and wear resistance equivalent to high molecular weight varieties of polyethylene. This material is not subject to the deteriorating effect of temperature because it is no longer thermoplastic.

The cross-linking of polyethylene by means of peroxides is well known, for instance (1) Narkis and Miltz, Journal of Applied Polymer Science, Vol. 12, pp. 1,031–39 (1968) and (2) K. S. Tenney, SPE Journal, Vol. 26, No. 3, pp. 68–71 (1970), described such procedures. In our own laboratories it has been found that a commercial variety of low molecular weight linear polyethylene (less than 500,000 M.W.) such as Phillips Petroleum Company's Marlex 4601 could be cross-linked by compression molding for 10 minutes at 180°C when previously admixed with amounts of 2,5 dimethyl-2,5-di(tert. butyl peroxy) hexane ranging from 0.25 to 1.0 percent based on solid polyethylene. The gel content was found to range from 89 to 98 percent, showing substantial cross-linking. In another case a similar material (USI 8811B) was crosslinked at 200°C with amounts of di-cumyl peroxide ranging from 0.25 to 1 percent; the cross-linked specimens were insoluble in boiling xylene.

The XC–142, of USI, is a version of their commercially available chemically cross-linkable polyethylene compounds. These materials are mixtures of polyethylene and ethylene-vinyl acetate copolymer containing a pre-mixed organic peroxide, suitable pigments and mold release agents. They are extrudable and cross-linkable. XC–142 is formulated to exclude the mold release agent (stearic acid or its salts or esters) which interferes with subsequent adhesive bonding.

When XC–142 is injection molded at 400°F, it possesses the following properties:

| | |
|---|---|
| Density | 0.947 |
| Tensile Strength | 2,300 psi |
| Yield Point | 2,450 psi |
| Elongation | 3,200% |
| 1% Tensile Modulus | 77,000 psi |
| Torsional Stiffness | 46,000 psi |
| Flexural Stiffness | 50,000 psi |
| Vicat Softening Point | 121°C |
| Shore Hardness | D–56 |
| Stress Crack Resistance | More than 48 hrs. |

It is apparent that other cross-linkable polyolefins could be substituted for the polyethylene, for example cross-linkable polypropylene or crosslinkable polybutadiene.

Consideration of other thermoplastic materials were made and rejected for one or more reasons. Most other thermoplastics show thermal instability or softening which can take many forms such as plastic deformation under load as a result of low heat distortion, actual melting or sloughing of heated portions, relaxation after tip imbedment and the like. The material that had sufficiently high heat distortion temperatures above 105° C such as polyphenylene oxide and polytetrafluorethylene do not have sufficient abrasion or impact resistance. The rejection of other were based upon specific gravity in excess of 1.00 such as polysulfone and others which would be too heavy.

The following table sets forth the reason for the unsatisfactory behavior of a number of materials. Thermal instability or softening is abbreviated T.I. and the impact was measured by the Izod method. The following table summarizes the results:

TABLE

| Material | Reason |
|---|---|
| Ultra High Molecular Weight (3–5MM) Polyethylene | T. I. |
| Polyproplene | T.I., abrasion, Izod impact (0.6 No./inch notch) |
| Polyphenylene Oxide (PPO) | Abrasion, Izod impact (0.6 No./inch notch), specific gravity (1.06) |
| Modified PPO | Abrasion, Izod impact (0.6 No./inch notch), specific gravity (1.06) |
| Acrylonitrile-Butadiene-styrene | T.I., abrasion, Izod impact 0.6 No./inch notch) specific gravity (1.06) |
| Styrene-acrylonitrile | T.I., abrasion, Izod impact (0.2no./inch notch) specific gravity (1.06) |
| Polystyrene | T.I., abrasion, Izod impact (1.0 no./inch notch) specific gravity (1.06) |
| Polycarbonate | Density (specific gravity 1.20) |
| Nylon 6—6 | Density (specific gravity (1.13) Izod impact (0.9 no./inch notch) |
| Nylon 6 | Density (specific gravity 1.14) Izod impact (0.9 no./inch notch) |
| Polysulfone | Density (specific gravity 1.24) Izod impact (1.3 no./inch notch) |
| Polymethylmethacrylate | Density (specific gravity 1.18) |
| Acetal | Abrasion, density |
| Polymethylpentene | Abrasion, impact |
| Cellulose-acetate-butyrate | Abrasion, density |
| Polyvinyl chloride | Abrasion, density |
| Phenoxy | Abrasion, density |

BRIEF DESCRIPTION OF THE DRAWINGS

FIG. 1 is an isometric view of a shuttle;

FIG. 2 is an isometric view of a multiple shuttle blank from which the individual shuttle blanks can be cut;

FIG. 3 is an isometric view of a special cleavage testing shape, and

FIG. 4 is a cross-sectional view along the line 4—4 of FIG. 1.

DESCRIPTION OF THE PREFERRED EMBODIMENTS

FIG. 1 shows an ordinary shuttle of the plastic type with cores 1 at each end, tips 2, side walls 3, and eye 4, and conventional bobbin spring 5. The side walls are made of the usual plastic laminate construction, for example textile reinforced thermosetting phenolic resin. The tips 2 which are of metal, eye 4 and bobbin spring 5 are conventional and are merely shown for completeness in FIG. 1. However, the bobbin or quill is not shown as this is not changed by the invention and would only confuse the drawings.

Turning to FIGS. 2 and 4, it will be seen that there is a distinct core material 1 between the side walls 3. This core material is made of a high impact resistant cross-linked polyethylene. Cross-linking is effected by a peroxide method, using calcium carbonate as a peroxide carrier. The drawings do not show any additional pigments, but the invention includes also such pigmented cross-linked polyethylenes available from U.S. Industrial Chemical Company and identified as XC142.

In order that the invention be more clearly understood, the following examples are set forth:

EXAMPLE 1

A compression mold having a height of 5 inches, width of 1½ inches and length of 6 inches was loaded with XC-142 cross-linkable polyethylene compound. A pressure of 500 psi was applied to the 5 × 1½ inch face and the mold heated to 140° C whereupon the compound softened and was consolidated into a block having the dimensions of the mold. The mold temperature was then raised to 175° C whereupon cross-linking of the compound occurred. The mold was cooled to room temperature, while maintaining the pressure, and the block extracted from the mold. The specific gravity of the molded cross-linked polyethylene is about 0.90. The 5 × 6 inch faces of the block were sanded with 50 grit paper and flame oxidized to promote adhesion. These faces were then coated with an epoxy adhesive (RP 4012, REN Plastics, Lansing, Mich.) and assembled with side wall sections as shown in FIG. 2. The assembly was held under 5 psi clamping pressure for 16 hrs. at 70°F to allow the adhesive to set. Thereafter the blank was cut along the phantom line 6 of FIG. 2 to provide blanks from which individual shuttles could be machined. By drilling holes at appropriate points on the shuttle blank (part 1 of FIG. 1), steel tips may be inserted so that they will be located as item 2 of FIG. 1. By heating the metal tip to about 200° C, it may be inserted into a drilled hole whose diameter is several thousandths of an inch smaller than the tip shank (not shown). It is an advantage of cross-linked polyethylene that it is resilient enough to distort sufficiently to allow this insertion; upon cooling, the tip is firmly fastened to the core without the use of any adhesive. Of course, an adhesive may also be used but is not required.

FIG. 3 shows a particular shape of test material with sidewalls 3, core 1 and notches 7. This particular cleavage test method is used to demonstrate the enhanced bond properties of the cross-linked polyethylene core material to the sidewall element. A cleavage test is made by looping ⅛ inch cable loops around the ends of the specimen in the notches 7. The other end of each cable loop is attached to either the upper or lower grips of an Instron tensile tester. The specimen is then preloaded to 10 pounds before testing. The crosshead is moved at a speed of 0.1 inch per minute, pulling the side wall sections away from each other, with a recording chart recording 1 inch per minute. These specimens are tested and their average used as the result for a single test. In order to determine the influence of heat on the adhesive joint, one set of tests is made at 70°F and another set at 160° F. When conventional shuttle assemblies using cotton-phenolic laminated cores and cotton-phenolic laminated side walls are tested they produce cleavage strengths of 45–50 lbs. at 70° F and 35–40 lbs. at 160° F. When the cross-linked polyethylene cores, bonded as previously described, are substituted for the conventional cotton-phenolic cores the cleavage strength is equal-to or better-than that of the conventional core assembly.

A shuttle produced according to example 1 and used in a textile loom operation exceeded 25,000,000 picks (a pick is one flight across the loom) without showing any deleterious effects such as tip loosening, wearing and the like. A conventional molded fabric reinforced phenolic type shuttle will normally last for about the same number of picks before it must be replaced.

COMPARATIVE EXAMPLE 2

Example 1 is repeated in all essential details except that instead of using the cross-linked polyethylene, an ultra high molecular weight (3–5MM) polyethylene (without cross-linking) was used. After about 500,000 picks on a loom, the shuttle had to be replaced because the tip was forced into the core leaving a rough interface between the metal tip and core which caused fiber entanglement. Furthermore, large portions of the core itself were eroded away by contact with the warp yarns in the fabric being woven or with contact with other parts of the loom.

EXAMPLE 3

Example 1 was repeated in all essential details except that instead of using a cross-linked polyethylene, a cross-linked polypropylene was used. The results were the same as for example 1.

COMPARATIVE EXAMPLE 4

Example 1 was repeated in all essential details except a linear non-crosslinked polyethylene of 300,000 molecular weight was substituted for the cross-linked polyethylene in the core. When the shuttle was used in a loom trial it failed after 50,000 picks due to excessive softening followed by distortion and erosion.

COMPARATIVE EXAMPLE 5

Example 1 was repeated in all essential details except that polymethylmethacrylate of 400,000 molecular weight and having a density of 1.15 was substituted for the cross-linkable polyethylene in the core. When the shuttle was used in a loom trial, it shattered almost immediately.

EXAMPLE 6

Example 1 is repeated in all details except that the side wall 3 is replaced with a composite formed of five types of layers: an outer and inner wearing layer of cotton fabric impregnated with thermosetting resin which are consolidated under pressure, then two layers of glass fiber cloth also impregnated with thermosetting resin and heat and pressure consolidated; and finally a bulking layer of wood, all five layers being firmly bonded together to form a unitary structure.

The shuttle thus produced had a specific gravity of about 1.00 and a significant increase in sidewall rigidity. A conventional shuttle would have a specific gravity of about 1.40.

I claim:

1. A plastic shuttle construction having side walls bonded to cores at the end and impact tips bonded to the end of the cores, the core being of cross-linked thermoset polyolefin, the shuttle ends showing increased resistance to cleavage from the core, decreased core splitting, and improved bonding of the impact tips to the cores, the shuttle having decreased weight and permitting higher loom operating speeds therewith.

2. A shuttle according to claim 1 in which the cross-linked polyolefin is polyethylene and is cross-linked by reaction with peroxide.

3. A shuttle according to claim 1 in which the cross-linked polyolefin is a mixture of polyethylene and ethylene-vinyl acetate copolymer.

4. A shuttle according to claim 1 in which each of the sides of the shuttle are a composite laminated sidewall formed of five types of layers: outer and inner wearing layers of cotton fabric impregnated with thermosetting resin which are consolidated under heat and pressure, then two layers of glass fiber cloth also impregnated with thermosetting resin and heat and pressure consolidated, and finally a bulking layer, all five layers being firmly bonded together to form a unitary whole wherein the resins become thermoset and which exhibits increased rigidity.

* * * * *